No. 735,345. PATENTED AUG. 4, 1903.
J. CZAPIKOWSKI.
SUGAR BOILER.
APPLICATION FILED DEC. 11, 1902.
NO MODEL. 2 SHEETS—SHEET 1.

Witnesses.
H. Mori.
C. Heymann.

Inventor.
Jan Czapikowski.
by P. B. Singer.
Att'y.

No. 735,345. PATENTED AUG. 4, 1903.
J. CZAPIKOWSKI.
SUGAR BOILER.
APPLICATION FILED DEC. 11, 1902.
NO MODEL. 2 SHEETS—SHEET 2.
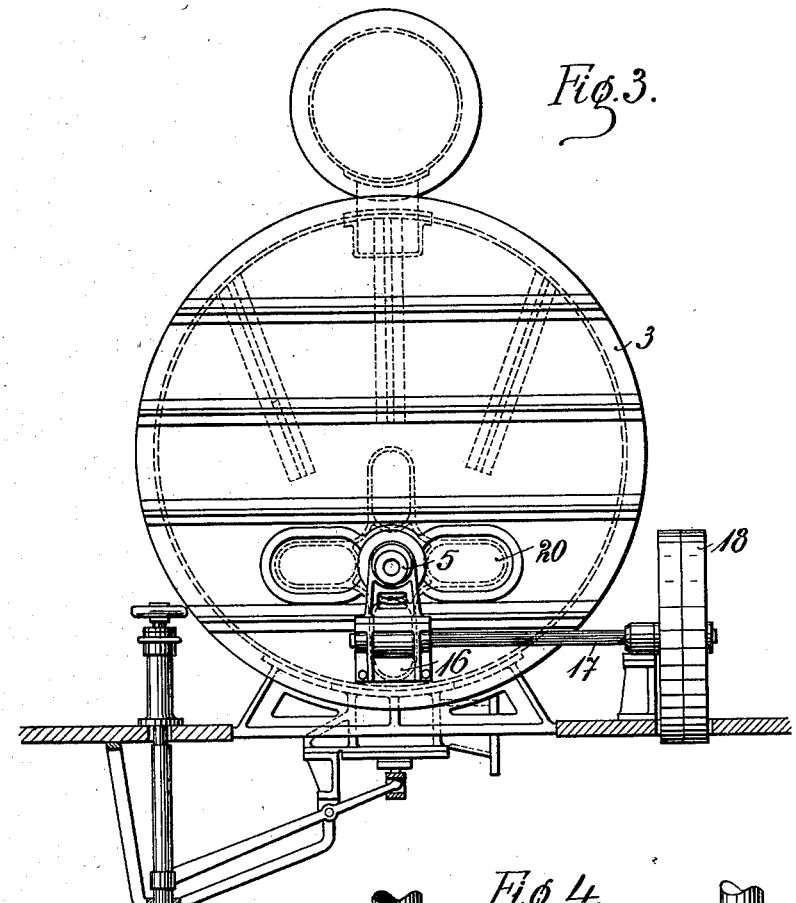
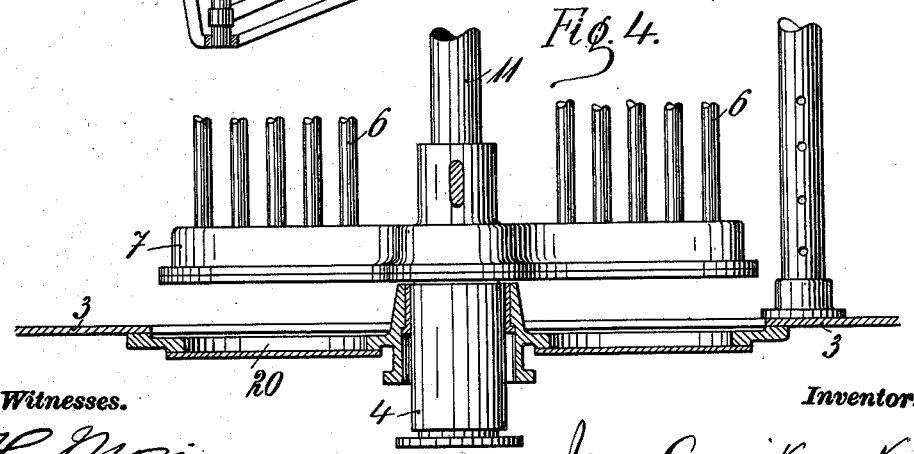

No. 735,345.

Patented August 4, 1903.

UNITED STATES PATENT OFFICE.

JAN CZAPIKOWSKI, OF NYMBURK, AUSTRIA-HUNGARY.

SUGAR-BOILER.

SPECIFICATION forming part of Letters Patent No. 735,345, dated August 4, 1903.

Application filed December 11, 1902. Serial No. 134,805. (No model.)

*To all whom it may concern:*

Be it known that I, JAN CZAPIKOWSKI, a subject of the Russian Emperor, residing at Nymburk, in the Kingdom of Bohemia, Austria-Hungary, have invented a new and useful Sugar-Boiler, of which the following is a specification.

My invention relates to the boiling of sugar-juices and the like in vacuum pans or boilers, which boiling has to be performed in a short time and so completely that the boiled juice shall contain as little water as possible without losing in its quality, as shall be described by reference to the accompanying drawings.

Figure 1:
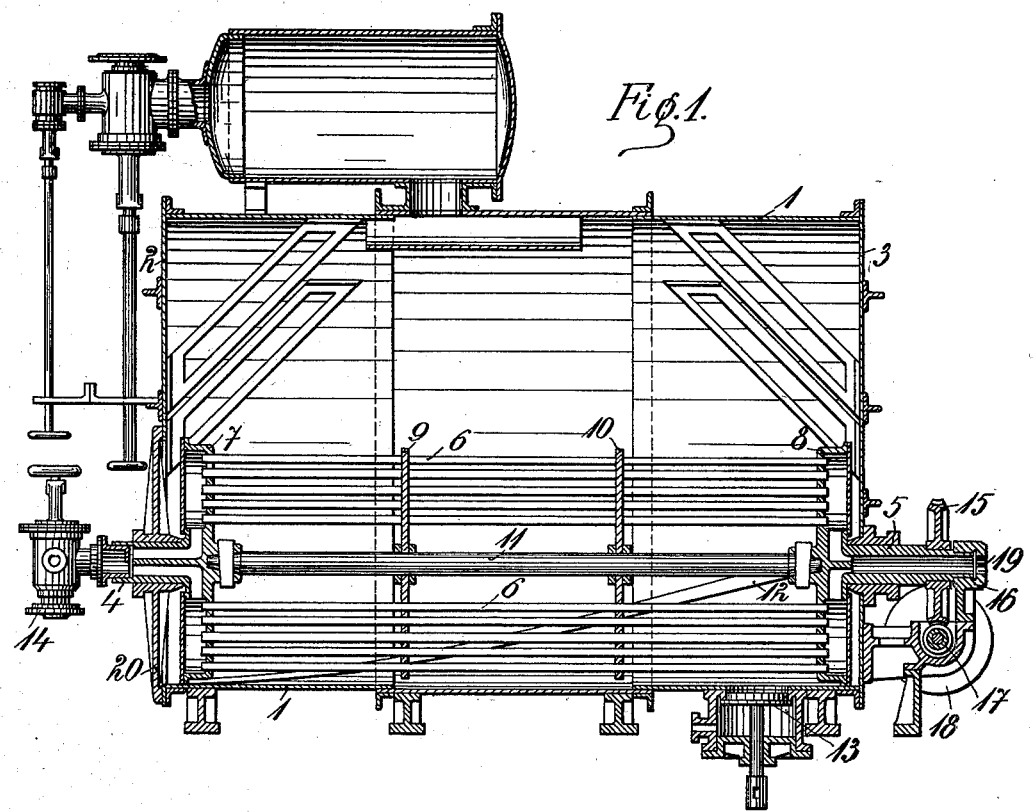
Figure 2:
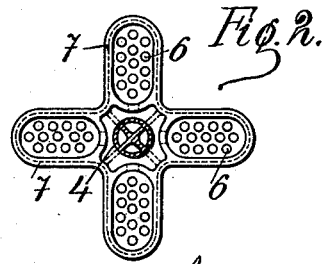

Figure 1 is a vertical section of the boiler with its mixer, an end view of which is shown by Fig. 2. Fig. 3 is an end view of the boiler, the sight-holes and other usual fittings being omitted in the drawings. Fig. 4 is a sectional elevation drawn to a larger scale of a detail.

1 is the body of the horizontal boiler, of which the ends are marked 2 and 3. Inside the boiler and contiguous to the bottom a mixer is provided, it being carried by its hollow gudgeons 4 and 5 in suitable bearings in the side walls of the boiler, the bearing of the gudgeon 4 being located in the door 20 of a manhole of the boiler. The mixer extends the whole length of the boiler, and consists of a pair of heads formed with hollow arms 7 8, which are integral with their gudgeons 4 and 5, horizontal tubes 6 connecting the arms 7 and 8 on a central shaft or tie 11. Support-plates 9 and 10 are fixed upon the shaft 11, through which the tubes 6 pass and which keep the tubes in their places. Steam or water is caused to circulate inside the mixer through the tubes 6 from gudgeon 4 to gudgeon 5. It will be understood that all parts of the mixer must be perfectly tight. The number of the arms is not limited, with the condition that there must be left space between arm and arm, because otherwise the mixer rolls the mass of sugar when it has thickened with it, and there would be no mixing brought about at all.

A scraper or the like 12 is provided on the periphery of the mixer, and consists of an iron knife of spiral shape, which during the rotation of the mixer scrapes the bottom of the boiler from one end of the boiler and from every point of the bottom to the orifice of its exit, which is normally shut off by means of a valve 13 in any well-known way.

The gudgeon 4 serves as an entrance, and the other gudgeon 5 is provided with a worm-wheel 15, gearing with a worm which is fixed upon the shaft 17, which is driven by means of pulleys 18 or in any other manner. The end of the gudgeon 5 is also journaled in the support 16, which has an opening 19 corresponding with a tube which is to be fixed in connection therewith for the exit of the heating-steam or cooling liquid which flows through the tubes 3 of the mixer during the process of boiling or cooling, said tube not being shown.

To concentrate sugar-juice in my vacuum-boiler, it is boiled by hot steam, which is passed through the tubes of the rotating mixer. This is done through valve 14, gudgeon 4, pipes 6, gudgeon 5, openings 19, and the tube or conduit, which is not indicated in the drawings. At the same time the mixer is continually rotated. In this way the juice can easily and in a short time be concentrated up to three to four per cent. of water only, which has hitherto not been possible to obtain with any other vacuum-boiler. After this for the purpose of removing this very sticky and semi-fluid sugar-juice cooling-water is circulated through the mixer by valve 14 instead of hot steam, seven to eight per cent. of syrup being introduced into the almost waterless sugar-juice while the mixer is being rotated continually. Thus the mass is cooled and made more liquid without getting more watery, and after a short time it can be allowed to flow out by opening the valve 13 at the bottom of the boiler. The last remainder of the thick liquid, which otherwise would stick to the bottom of the boiler, is scraped out by the spiral knife 12 toward the opening in the bottom.

I am aware that prior to my invention vacuum-pans with tubular rotary mixers have been made and patented. I therefore do not claim such a combination broadly; but What I do claim as my invention, and desire to secure by Letters Patent, is—

1. In a device for boiling liquids, the combination of a closed cylindrical boiler, a mixing device in said boiler, comprising tubular members connecting with hollow arms, hollow gudgeons integral with said arms, bearings in said boiler for said gudgeons, supporting-plates for said tubular members, means for rotating said mixing device, means for regulating the flow of heating or cooling fluids through said gudgeons, arms and tubes, and a scraper secured to said mixing device.

2. The combination and apparatus for boiling sugar-juices and the like, consisting of a boiler provided with a rotary arm-mixer, said mixer being formed of tube 6 fitted in connection of hollow arms 7, 8 carried by hollow gudgeons 4, 5 supported in bearings in the boiler as described and shown; a central shaft or tie-bar 11 secured at its ends to the hollow heads which are integral with said arms 7, 8; supporting-plates 9, 10; means for supplying the heating and cooling fluids to said gudgeons 4, 5, and means for rotating said mixer, substantially and for the purpose as hereinbefore described and illustrated by the drawings.

3. The combination, with a rotary heating and cooling arm-mixer as described, of a spiral scraper or knife 12 attached to said mixer adapted to remove the adhering juices from the bottom of said boiler and to convey the same toward an outlet or opening governed by a valve 13, substantially as specified.

In testimony whereof I affix my signature in presence of two witnesses.

JAN CZAPIKOWSKI.

Witnesses:
 ADOLPH FISCHER,
 LADISLAV VOJATELY.